(12) United States Patent
Kumar et al.

(10) Patent No.: US 12,177,282 B2
(45) Date of Patent: Dec. 24, 2024

(54) SYSTEM AND METHOD FOR ULTRA LOW LATENCY LIVE STREAMING BASED ON USER DATAGRAM PROTOCOL

(71) Applicant: Samsung Electronics Co., Ltd., Suwon-si (KR)

(72) Inventors: Luckraj Shrawan Kumar, Karnataka (IN); Gopinath Chennakeswaran, Karnataka (IN); Renuka Varry, Karnataka (IN); Divyanshu Chuchra, Karnataka (IN); Umang Bhatia, Haryana (IN); Utkarsh Mohan, Bihar (IN); Aalok Kumar Gupta, Jharkhand (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/955,444

(22) Filed: Sep. 28, 2022

(65) Prior Publication Data
US 2023/0094815 A1    Mar. 30, 2023

(30) Foreign Application Priority Data

Sep. 28, 2021 (IN) ............................ 202141044027
Aug. 1, 2022 (IN) ............................ 202141044027

(51) Int. Cl.
H04L 65/756    (2022.01)
H04L 65/75    (2022.01)

(52) U.S. Cl.
CPC .......... *H04L 65/756* (2022.05); *H04L 65/765* (2022.05)

(58) Field of Classification Search
CPC ..... H04L 65/756; H04L 65/765; H04L 65/61; H04L 65/70

(Continued)

(56) References Cited

U.S. PATENT DOCUMENTS

| | | |
|---|---|---|
| 9,749,178 B2 | 8/2017 | Singh |
| 2020/0162535 A1* | 5/2020 | Ma ........................ G06N 3/08 |
| 2021/0195206 A1* | 6/2021 | Hannuksela ......... H04N 19/149 |

FOREIGN PATENT DOCUMENTS

CN    108965949    6/2020

OTHER PUBLICATIONS

T. Bova, et al., "Reliable UDP Protocol", Network Working Group, Internet Draft, Feb. 25, 1999, 14 pages, https://datatracker.ietf.org/doc/html/draft-ietf-sigtran-reliable-udp-00.

(Continued)

*Primary Examiner* — David R Lazaro
*Assistant Examiner* — Zia Khurshid
(74) *Attorney, Agent, or Firm* — Nixon & Vanderhye, P.C.

(57) ABSTRACT

An example method includes for enhancing video streaming includes inputting a client-side environment parameter to a client-side neural network (NN) implemented in a client device and then training the client-side NN based on the inputted client-side environment parameter. Thereafter, a client-side encoding bit rate is determined based on a result of the training of the client-side NN and then transmitting the determined client-side encoding bit rate as an input to a server-side neural network (NN) implemented in a server device. The method further includes training the server-side NN based on the inputted client-side encoding bit rate and a server-side environment parameter. Then, a server-side encoding bit rate is determined based on a result of the training of the server-side NN and thereafter, an encoding bit rate of an encoder for the video stream is adjusted based on the determination of the server-side encoding bit rate, and the server-side environment parameter.

13 Claims, 7 Drawing Sheets

(58) Field of Classification Search
USPC .......................................................... 709/203
See application file for complete search history.

(56) References Cited

OTHER PUBLICATIONS

Tianchi Huang, et al., "*Comyco*: Quality-Aware Adaptive Video Streaming via Imitation Learning", Proceedings of the 27$^{th}$ ACM International Conference on Multimedia (MM '19), Article 4, Oct. 21-25, 2019, 9 pages.

Tianchi Huang, et al., "QARC: Video Quality Aware Rate Control for Real-Time Video Streaming via Deep Reinforcement Learning", 2018 ACM Multimedia Conference (MM '18), Article 4, Oct. 22-26, 2018, 10 pages.

Traci Ruether, "Streaming Protocols: Everything You Need to Know", Resource Center, Jan. 20, 2022, 11 pages, https://www.wowza.com/blog/streaming-protocols.

\* cited by examiner

SYSTEM AND METHOD FOR ULTRA LOW LATENCY LIVE STREAMING BASED ON USER DATAGRAM PROTOCOL

CROSS-REFERENCE TO RELATED APPLICATIONS

This application claims priority under 35 U.S.C. § 119 to Indian Provisional Patent Application No. 202141044027, filed on Sep. 28, 2021, and to Indian Patent Application No. 202141044027 filed on Aug. 1, 2022, the disclosures of each of which are incorporated by reference herein in their entireties

BACKGROUND

1. Field

The present disclosure relates to a method and system for enhancing video streaming. In particular, the present disclosure relates to a method and system for ultra-low latency live streaming based on User Datagram Protocol (UDP).

2. Description of Related Art

In a video streaming scenario, the environment consists of a client-side module, a server-side module, and a transmission medium. Adding inter-dependency between the above modules may reduce the delay of the system. Further, a partial improvement in the system may be achieved by deploying a server-based algorithm, which uses Neural Network (NN), Reinforcement Learning (RL), k-means, tuning of parameters, etc. However, a server-based algorithm takes a long time to affect and is not easily adaptable, especially if the client environment is vastly different. It is also difficult to predict the system configuration both at the client and server-side in the case of over-the-internet, lossy scenarios, and high bandwidth fluctuation. The client and server environment may be vastly different in throughput, computing power, etc. The client knows its environment well so it should select the quality, quantity, and personalization provided input to which it plays. It should provide more proper input to quickly adapt to the server to the client environment. The medium of transmission to which the server is connected is like a dedicated network line, but the client may connect to 3G, 4G, 5G, Wi-Fi, and WIFI direct, so it will add some information about the medium also. Packet loss and recoverability to packet loss also depend on the transmission medium.

Further, due to a tight millisecond-level latency restriction for real-time video streaming, TCP-based video streaming is not suited for performing real-time video streaming. Now in UDP-based video streaming, due to loss and low recovery, adds up the latency, especially in a case in which content is of high resolution like 4 k or 8 k, for example.

Thus, there is a need for a solution that considers the client side, server side, and the medium, by predicting the encoding bitrate and adapting to fluctuating network conditions to reduce the latency and maintain it for reliable ultra-low latency video streaming There is also a need for a solution that reduces the packet size in a case of UDP-based streaming to adapt to the environment such as packet loss, high frame size, network condition using the predicted bitrate providing approval for the specification.

Therefore, there is need for a mechanism for ultra-low latency live streaming based on User Datagram Protocol (UDP) for enhancing video streaming.

SUMMARY

This summary is provided to introduce a selection of concepts in a simplified format that are further described in the detailed description. This summary is not intended to identify key or essential concepts of the disclosure, nor is it intended for determining the scope of the disclosure.

In an implementation, the present subject matter refers to a method and system for enhancing video streaming. The method includes inputting a client-side environment parameter to a client-side neural network (NN) implemented in the client device and then training the client-side NN based on the inputted client-side environment parameter. Thereafter, the method includes determining a client-side encoding bit rate based on a result of the training of the client-side NN and then transmitting the determined client-side encoding bit rate as an input to a server-side neural network (NN) implemented in a server device. The method further includes training the server-side NN based on the inputted client-side encoding bit rate and a server-side environment parameter. Then, the method performs determining a server-side encoding bit rate based on a result of the training of the server-side NN and thereafter, adjusting an encoding bit rate of an encoder for the video stream based on the determination of the server-side encoding bit rate, and the server-side environment parameter.

To further clarify the advantages and features of the present disclosure, a more particular description will be provided by reference to specific embodiments thereof, which is illustrated in the appended drawings. It is appreciated that these drawings depict only example embodiments and are therefore not to be considered as limiting the scope of the disclosure.

In an embodiment, a method for enhancing video streaming may be provided. The method may include inputting a client-side environment parameter to a client-side neural network (NN) implemented in the client device. The method may include training the client-side NN based on the inputted client-side environment parameter. The method may include determining a client-side encoding bit rate based on a result of the training of the client-side NN. The method may include transmitting the determined client-side encoding bit rate as an input to a server-side neural network (NN) implemented in a server device. The method may include training the server-side NN based on the inputted client-side encoding bit rate and a server-side environment parameter. The method may include determining a server-side encoding bit rate based on a result of the training of the server-side NN. The method may include adjusting an encoding bit rate of an encoder for the video stream based on the determination of the server-side encoding bit rate, and the server-side environment parameter.

In an embodiment, a system for enhancing video streaming, comprising a client device and a server device operatively communicating with each other within a network may be provided. The system may include one or more processor. The one or more processors may be configured to input a client-side environment parameter to a client-side neural network (NN) implemented in the client device. The one or more processors may be configured to train the client-side NN based on the inputted client-side environment parameter. The one or more processors may be configured to determine a client-side encoding bit rate based on a result of the training of the client-side NN. The one or more processors may be configured to transmit the determined client-side encoding bit rate as an input to a server-side neural network (NN) implemented in a server device. The one or more processors may be configured to train the server-side NN based on the inputted client-side encoding bit rate and a server-side environment parameter. The one or more processors may be configured to determine a server-side encoding bit rate based on a result of the training of the server-side NN. The one or more processors may be configured to adjust an encoding bit rate of an encoder for the video stream based on the determination of the server-side encoding bit rate, and the server-side environment parameter.

In an embodiment, a non-transitory machine-readable medium containing instructions that when executed cause one or more processors for enhancing video streaming may be provided. The one or more processors may be configured to input a client-side environment parameter to a client-side neural network (NN) implemented in the client device. The one or more processors may be configured to train the client-side NN based on the inputted client-side environment parameter. The one or more processors may be configured to determine a client-side encoding bit rate based on a result of the training of the client-side NN. The one or more processors may be configured to transmit the determined client-side encoding bit rate as an input to a server-side neural network (NN) implemented in a server device. The one or more processors may be configured to train the server-side NN based on the inputted client-side encoding bit rate and a server-side environment parameter. The one or more processors may be configured to determine a server-side encoding bit rate based on a result of the training of the server-side NN. The one or more processors may be configured to adjust an encoding bit rate of an encoder for the video stream based on the determination of the server-side encoding bit rate, and the server-side environment parameter.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Further, it will be appreciated that elements in the drawings are illustrated for simplicity and may not have been necessarily been drawn to scale. For example, the flow charts illustrate example methods in terms of steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those having the benefit of the description herein.

DETAILED DESCRIPTION

It should be understood at the outset that although non-limiting illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element is limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the present disclosure will be described below in detail with reference to the accompanying drawings.

According to an embodiment, the present disclosure provides a system and method for ultra-low latency live streaming based on User Datagram Protocol (UDP). The method may include applying, a reinforcement neural network (NN) on a client side with client environment parameter and output information used as one of input to server side NN to predict final encoding bitrate which can be used for low latency streaming and maintaining it. The method may include training a client side NN with client environment maximizing client side Quality of Experience (QoE). The method may include training the server side NN in server environment with specific server side QoE. The method may further include using by the server side NN, the client side NN output as one of the inputs and a one of components in QoE to minimize the difference. The method may include updating the size of UDP packet as a function of change in encoding bitrate. A detailed implementation of the same will be explained in the forthcoming paragraphs.

Figure 1:
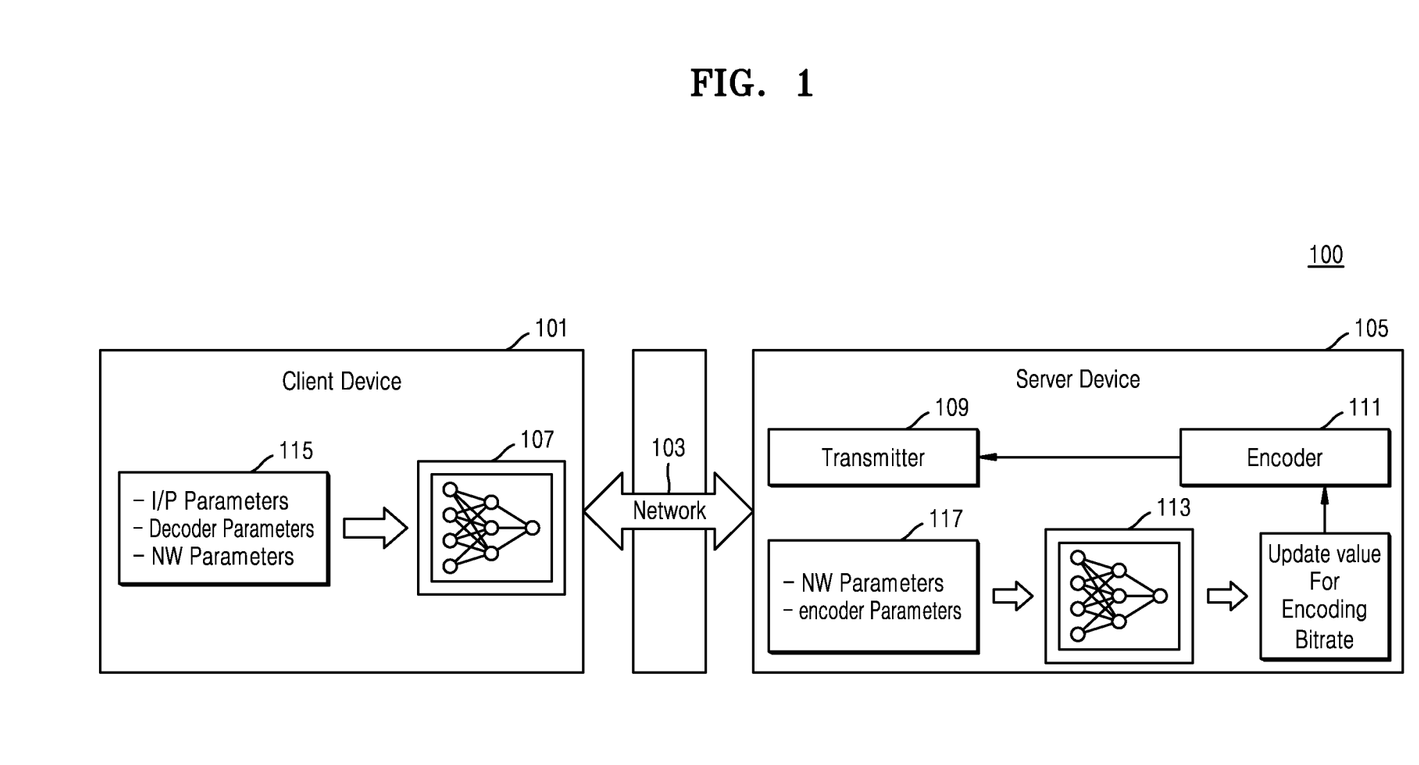
FIG. 1 illustrates a block diagram 100 of an example system for ultra-low latency live streaming based on User Datagram Protocol (UDP), according to various embodiments.

FIG. 1 illustrates a block diagram 100 of an example system for ultra-low latency live streaming based on User Datagram Protocol (UDP), according to various embodiments.

The system 100 includes client device 101 that communicates via various network mediums (media) 103 with a server device 105. The client device 101 and server device 105 may include one or more processors coupled with a memory (not shown here). The client device 101 and the server device 105 may further include at least one NN model 107 and 113 respectively for enhancing the video streaming. The server device 105 may further include a transmitter 109 configured to transmit data to the client device 101. The transmitter 109 may be coupled with an encoder 111 configured to encode the data before transmitting the data to the client device 101.

According to an embodiment of the present disclosure, the client device 101 as well as server device 105 may be configured to use different NN models specifically trained to a specific type of the network medium for example, but not limited to, 4G, 5G, Wi-Fi, WIFI direct. Further, the NN model 107 and 113 may include 2-3 fully connected hidden layer of varying size for example, but not limited to, 128, 64, and 32. Further, the outcome of the NN model 107 and 113 is based on dimensions of varying sizes. For example, for size 7, the output may be represented by 7 bitrates depending upon the type of network and client capabilities. The last layer may predict the optimal encoding bitrate. That is to say, it may predict whether change is needed in bitrate, and if so, then how much. Further, the input may be the dimension of n×k, where n is a number of past frames and k is a number of inputs. According to an embodiment, the client device 101 and the server device 105 may be configured to use reinforcement learning (RL) techniques such as Q learning, Policy gradient, A3C etc. for the NN models to maximize QoE. The client-side module 101 may be configured to use different NN models specifically trained to the specific type of network medium like 4G, 5G, Wi-Fi, WIFI direct.

Figure 2:
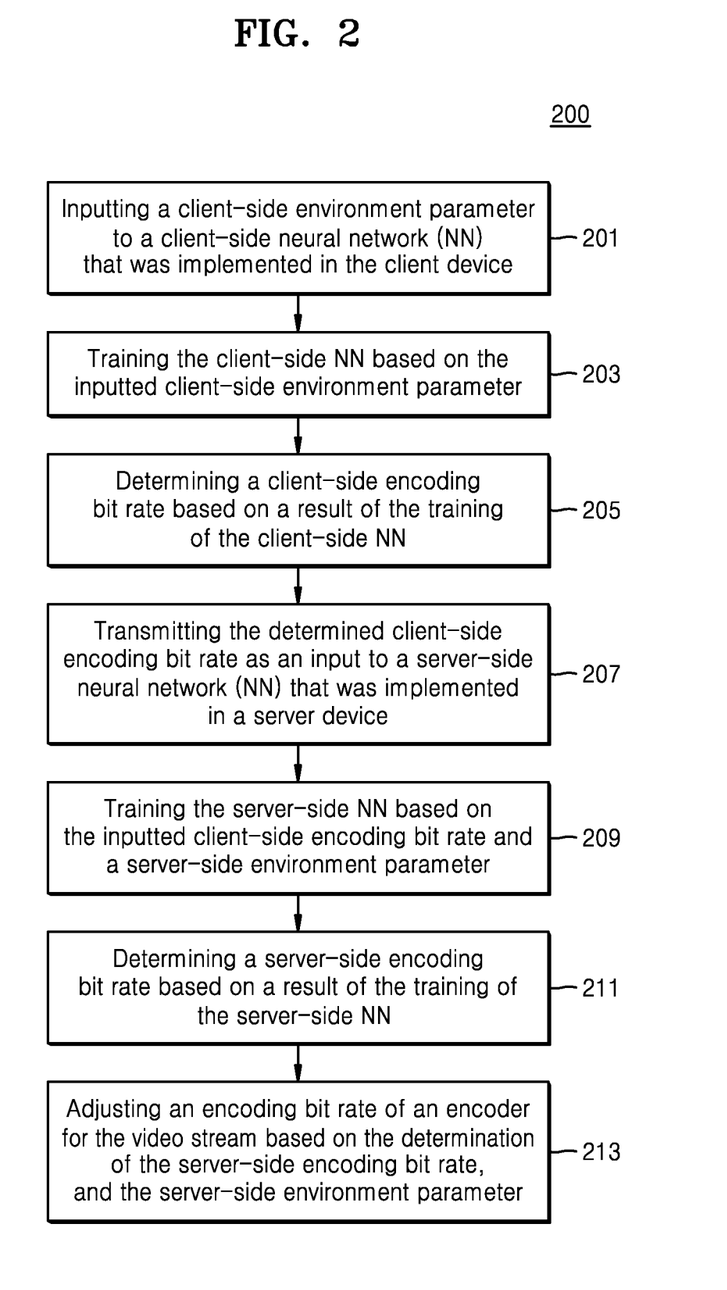
FIG. 2 illustrates a flow diagram for enhancing video streaming, according to various embodiments.

FIG. 2 illustrates a flow diagram for enhancing video streaming, according to various embodiments. Method 200 may be implemented in system 100 as shown in FIG. 1. In an example implementation, method 200 is performed using at least one processor. Further, method 200 will be explained with reference to FIG. 1 in the forthcoming paragraph.

Initially, at step 201, method 200 includes, one or more client-side environment parameters inputted to the client-side neural network (NN) that was implemented in the client device 101. As an example, the NN model 107 may be referred to as client-side neural network (NN) hereinafter. Further, the client-side environment parameters 115 are the parameters or values which are unique to the client environment. For example, the client-side environment parameters 115 may include, but are not limited to, I/P parameters, Decoder parameters, and NW parameters, and the like. For example, the client-side environment parameters 115 may include, but are not limited to, information related to decoding of frame per second (FPS), transmit and receive bytes at the client side, re-transmit count request to server for the lost packets, decoding delay, encoding frame size, render FPS, Buffer Size, Network throughput, and the like. The client-side environment parameters may also include, but are not limited to, information such as battery information, GPS coordinates, and other information that client doesn't want to share with the server for reasons like data security values dynamic in nature. After step 201, the method further proceeds to step 203. At step 203, method 200 performs training of the client-side NN 107 based on the inputted client-side environment parameters 115. In particular, at step 203, a reinforcement NN is applied on a client-side with client-side environment parameters 115, and the output information is sent as one of inputs to server-side NN 113 to predict the final encoding bitrate which is used for low latency streaming and maintaining it.

Thus, at step 205, based on a result of the training at step 203, method 200 includes determining a client-side encoding bit rate. Then, at step 207 the determined client-side encoding bit rate may be sent to the server device 105 as an input to the NN 113. As an example, the NN 113 may be referred as a server-side NN. Further, at the server device 105, along with the client-side encoding bit rate, server-side environment parameters 117 may also be inputted to the server-side NN 113. As an example, the server-side environment parameters 117 may include parameters and values which are unique to server parameters. For example, the server-side environment parameters 117 may include, but are not limited to, NW parameters, Encoder parameters, and the like. For example, the server-side environment parameters 117 may include, but are not limited to, information such as encoding frame per sec, queue size for pending frames for transmission, last encoding bitrate, encoding delay, encoding compression ratio, client predicted output, and the like. The server-side environment parameters 117 may also include, but are not limited to, information like the total number of client, server, memory, processing information, and other parameters which defines the server system.

At step 209, method 200, based on the inputted parameter at the server side NN 113 and the client-side encoding bit rate, the server-side NN 113 performs training Thereafter, at step 211, the result of the training determines a server-side encoding bit rate. Now, based on the determined server-side encoding bit rate and the server-side environment parameter, at step 213, an encoding bit rate of an encoder 111 for the video stream is adjusted or updated. Thus, the client-side NN outputs used as one of the inputs to the server-side NN minimizes the difference and adapts to a fluctuating network condition to reduce the latency and maintain it for ultra-low latency video streaming.

According to a further embodiment, in most ultra-low latency streaming protocols, when the UDP is used as an underlying transport protocol, the packet size can be up to the maximum transmission unit (MTU) payload depending upon the medium. For example, in Ethernet 1500 Bytes is equivalent to 1472 payload+28 (20 IP header+8 UDP header). Further, it is to be noted that 1500 is MTU size so ethernetV2 for Wi-Fi is 2304. So, the value is selected as per medium. The larger the packet in the lossy scenario, the more delay added for retransmission. However, for the bigger packet, packetization time and extra memory will be reduced.

Figure 3:
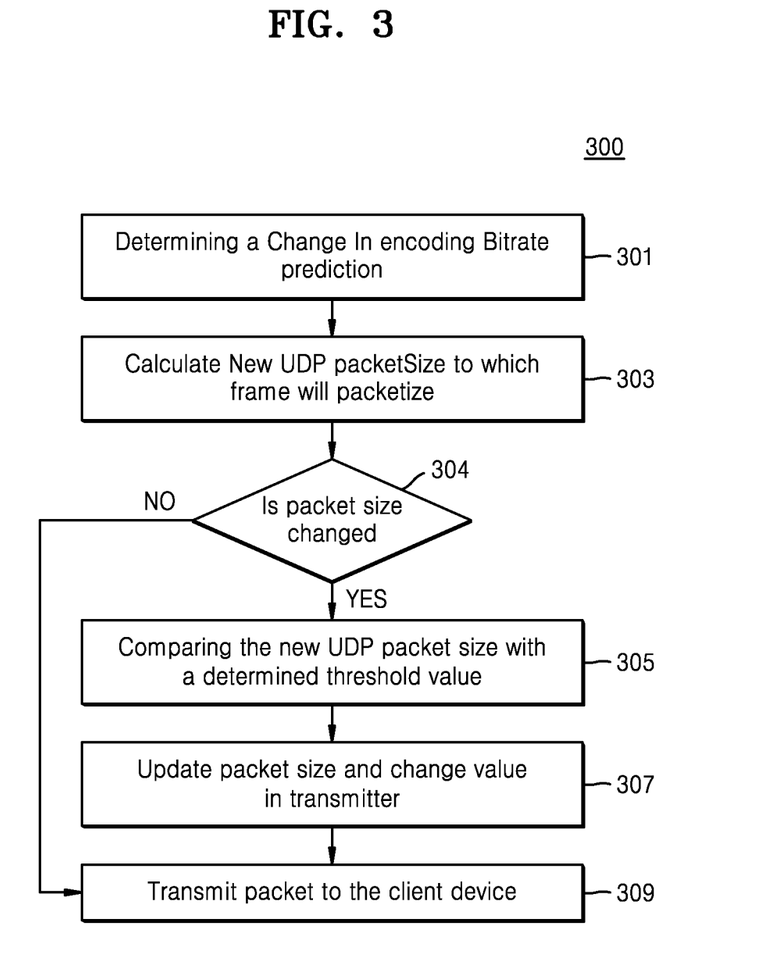
FIG. 3 illustrates a flow chart for updating the size of a UDP packet for transmission, according to various embodiments.

FIG. 3 illustrates a flow chart for updating the size of a UDP packet for transmission, according to various embodiments. According to an embodiment, the size of the UDP packet is updated as a function of change in the encoding bitrate due to step 213 above. Method 200 further may include method 300. Accordingly, at step 301, method 300 includes determining whether the encoding bit rate of the encoder is adjusted (changed) with respect to the server-side encoding bit rate. If it is determined that the encoding bit rate of the encoder is adjusted (changed) with respect to the server-side encoding bit rate, then at step 303, method 300 includes calculating a size of a UDP packet for streaming the video based on the determination. At step 304, method 300 determines if there is a change in the packet size. If it is determined that there is a change in the packet size, then the process proceeds to step 305.

In step 305, method 300 includes comparing the calculated size of the UDP packet with a predefined threshold size of the UDP packet. At step 307, method 300 updates the size of the UDP packet for streaming the video based on the result of the comparison. As an example, if the result of the comparison is that the calculated size of the UDP packet is less than the predefined lower threshold size, the calculated size of the UDP packet may be updated to the lower threshold size. Further, if the result of the comparison is that the calculated size of the UDP packet is greater than the predefined upper threshold size, the calculated size of the UDP packet may be updated to the predefined upper threshold. At step 309, the updated size of the packet is transmitted via a transmitter to the client device 101. If there is no change in the packet size at step 304, then at step 309 the UDP packet may be transmitted as it is.

In an embodiment, table 1 depicts the mechanism for calculating packet size with respect to change in server encoding bitrate. For example, x1 may mean that current encoding bitrate value minus last encoding bitrate value. Minimum packet size may assume 512. And, maximum packet size may assume 1472 Minimum packet size and maximum packet size may vary depending on the selected medium, and are not limited by the present disclosure.

If x1 is less than 0, that is, if the current encoding bitrate decrease, the new UDP packet size may be updated with the current UDP packet size plus x1. And, if the new UDP packet size updated is less than the predefined lower threshold size (512 in Table1), the new UDP packet size may be re-updated to the predefined lower threshold size. The new UDP packet size re-updated is not limited to the predefined lower threshold size, and may have any value between the lower threshold and the upper threshold. And then, the current UDP packet size may be updated to the new UDP packet size.

If x1 is greater than 0, that is, if the current encoding bitrate increase, the new UDP packet size may be updated with the current UDP packet size plus x1. And, if the new UDP packet size updated is greater than the predefined upper threshold size (1472 in Table1), the new UDP packet size may be re-updated to the predefined upper threshold size. The new UDP packet size re-updated is not limited to the predefined upper threshold size, and may have any value between the lower threshold and the upper threshold. And then, the current UDP packet size may be updated to the new UDP packet size.

TABLE 1

| |
|---|
| //change of packet w.r.t encoded bitrate |
| x1 = currentEncBitrate − lastEncBitrate) / (No_off_average_packet_perframe*fps) |
| //Assumed minimum packet size=512 and maximum packet size=1472 according to medium |
| if(x1<0){                                       if(x1<0){ |
|   NewUDPpacketSize= CurUDPpacket + x1;     NewUDPpacketSize= CurUDPpacket + x1; |
|   if(NewUDPpacketSize<512){                if(NewUDPpacketSize<1472){ |
|     NewUDPpacketSize=512;           NewUDPpacketSize=1472; |
|   }                                        } |
| }                                               } |
| CurUDPpacketSize=NewUDPpacketSize;              CurUDPpacketSize=NewUDPpacketSize; |

Continuing with the same embodiment, the system may be configured to maximize both client and server performance and may have a different set of inputs for both client and server. The Client side QoE may be calculated using equation 1

$$\text{Client QoE} = C1*(\text{RenderFPS}*\text{CurBitrate}) - C2*\text{Losspacketsize} - C3*(\text{Rebufduration}*\text{lastFramesize}) \quad (1)$$

where RenderFps is the frames rendered per second, CurBitrate is the current bitrate of client, Losspacketsize is the total packet size lost by client, RebufferDuration is Client re-buffer time, and Lastframesize is when client re-buffers what was size of last frame.

Further, the server side QoE may be calculated using equation 2

$$\text{ServerSide QOE} = S1*(\text{Efps}*\text{Cbitratre}) + S2*(\text{efps}*\text{AvgPacketCountperframe}*(\text{lastPackSize} - \text{currentPacketSize})) - S3*(\text{packetloss}*\text{avgBitrate}) - S4*(|\text{CBR} - \text{SBR}|) \quad (2)$$

where Efps is the encoding frame per second, Cbitrate is the current bitrate of server, AvgPacketCountFrame is the average number of packet frame is packet size before transmitting to network, LastpacketizationSize is the last UDP packet size in which frame is divided before transmitting over the network, currentpacketsize is the new changed packet size or equal to last packet size if not changed, CBR is the Bitrate predicted by client, and SBR is the bitrate predicted by server.

Figure 4:
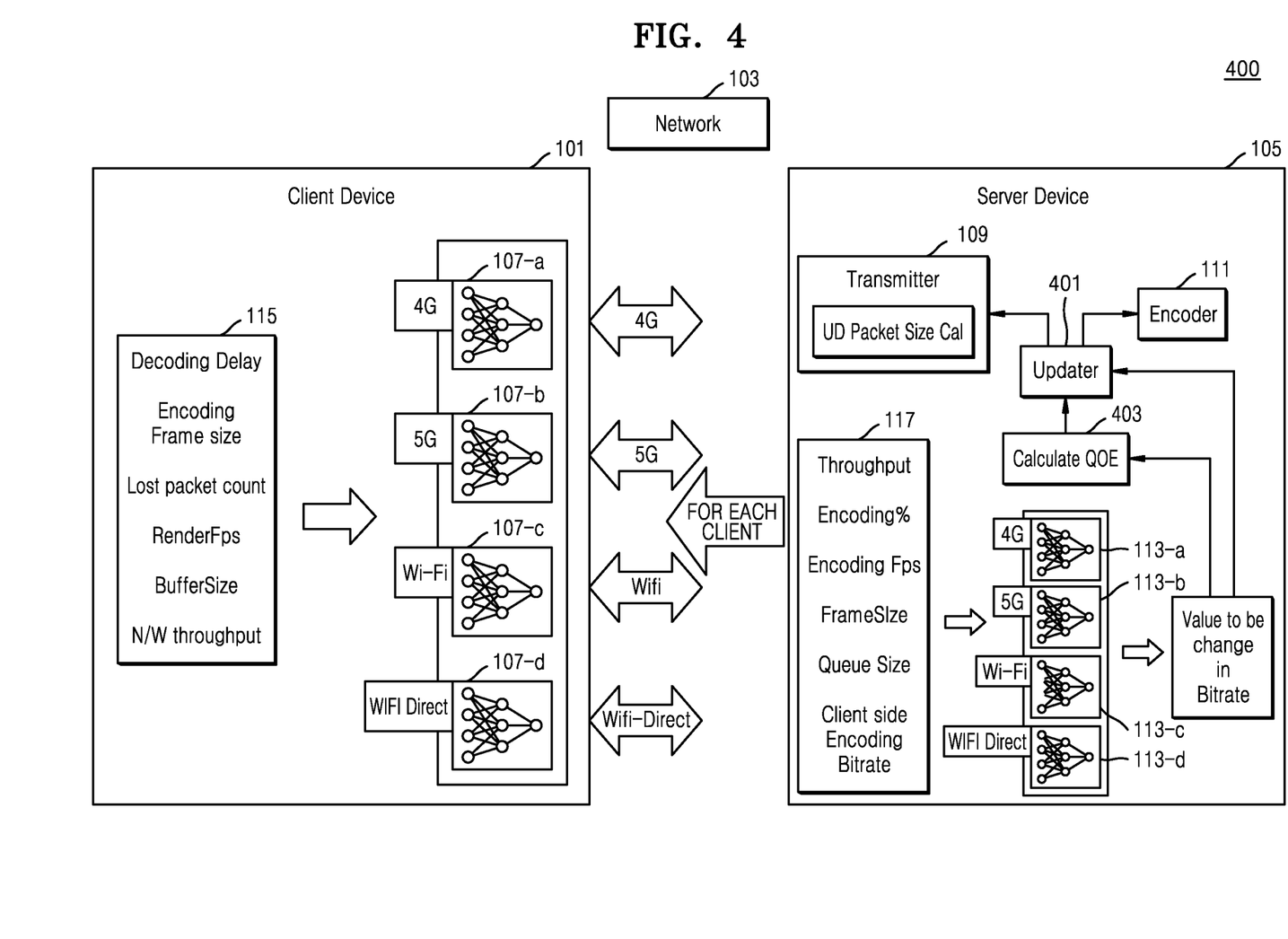
FIG. 4 illustrates an implementation of one or more NN models at the client and the server device, according to various embodiments.

FIG. 4 illustrates an implementation of one or more NN models at the example client device and the example server device, according to various embodiments. As shown in FIG. 4, the client device 101 and the server device 105 includes one or more NN models 107-a, 107-b, 107-c, 107-d, 113-a, 113-b, 113-c, 113-d respectively for each of the one or more networks. The networks may correspond to 4G, 5G, Wi-Fi, Wi-Fi direct. According to an embodiment, method 200 further includes determining the transmission medium of the video streaming Method 200 may be implemented in system 400 as shown in FIG. 4.

In an embodiment, server device may include updater module 401 and calculate QOE module 403. The updater module 401 may update the size of a UDP packet. The updating the size of the UDP packet is shown in FIG. 3. The calculating QOE module 403 may calculate the client side QoE and the server side QoE. The calculating QoE may be performed with referring to Equation 1 and 2.

Thereafter, method 200 selects at least one NN from the plurality of NN for training as the client-side NN based on the determination of the transmission medium for determining the client-side encoding bit rate. For example, if the transmission medium is a 4G then 107-a may be chosen for training the client side environmental parameters.

Accordingly, the present disclosure provides a solution that overcomes a problem of the environmental differentiation between server and client, so it is more adaptive and commercially feasible. The present disclosure uses a neural network model, which is a very light model, does not need significant computing power to execute, and runs parallel to main streaming so it does not affect the latency. The present disclosure uses reinforcement learning such as Q learning, Policy gradient, A3C etc., and on-device training that helps to learn the environment and hence does not use any sampling mechanism. The presence of at least two NN maximizes the Client QoE and other Server QoE. Additionally, other factors like UDP packetize also get updated with respect to encoder bitrate which further helps in reducing the packet loss and other memory-related operations. The mechanism has linear QoE but has different NN model for different network medium and two NN which is training and affecting each other and improves overall streaming unlike other techniques which maintain only one NN model in a server only. Some example technical effect of the present disclosure include:

- Maintains ultra-low latency,
- cloud-based or over the internet the UDP-based protocols are not successful due to loss, but this approach will help in quick recovery,
- Reducing the number of hidden layers and decreasing the server-side load, especially in cases of multiple clients,
- As client-side modify to support on Device/online training, so different NN model is helpful,
- It will help the server to understand the client environment in a better manner and predict suitable change in encoding bitrate, and
- The transmission network pattern is vastly different in different Network mediums like 4G, 5G, Wi-Fi, and WIFI-direct so network specific NN model is used for specific medium types.

Figure 5:
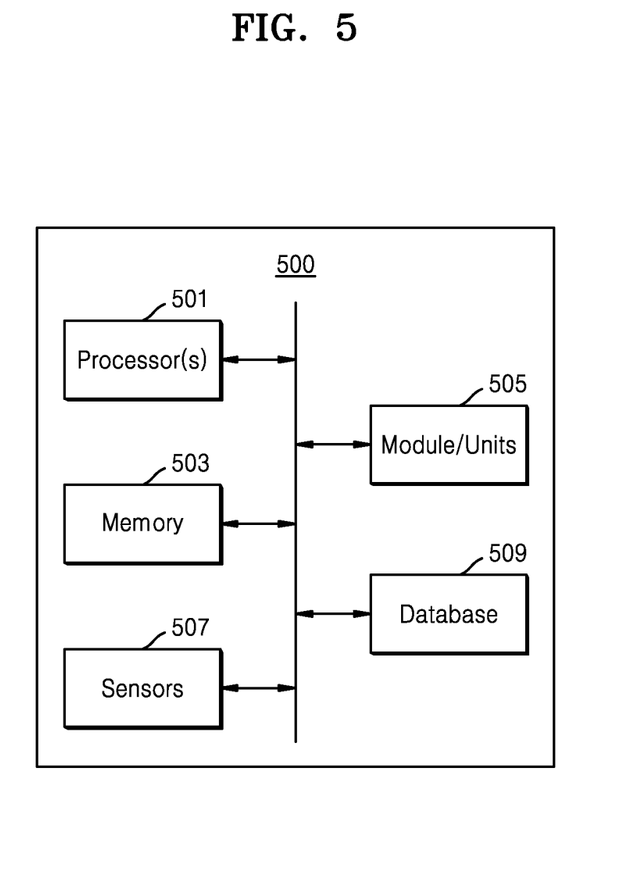
FIG. 5 illustrates a block diagram of an example client device 101 and an example server device 105, in accordance with various embodiments.

FIG. 5 illustrates a block diagram of an example client device 101 and an example server device 105, in accordance with various embodiments. The client device 101 and the server device 105 include one or more processors 501 coupled with a memory 503, and one or more sensors 507. The one or more processors 501 is further coupled with a module or units 505 and database 509.

As an example, the client device 101 and the server device 105 may correspond to various devices such as a personal computer (PC), AR glasses, a tablet PC, a personal digital assistant (PDA), a mobile device, a palmtop computer, a laptop computer, a desktop computer, a communications device, dashboard, navigation device, a computing device, or any other machine capable of executing a set of instructions.

In an example, the processor 501 may be a single processing unit including processing circuitry or a number of units, all of which could include multiple computing units. The processor 501 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 501 is configured to fetch and execute computer-readable instructions and data stored in the memory 503.

The memory 503 may include any non-transitory computer-readable medium (or media) known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s) 505, and/or unit(s) 505 may include a program, a subroutine, a portion of a program, a software component, a firmware component, or a hardware component capable of performing a stated task or function. As used herein, the module(s), engine(s), and/or unit(s) may be implemented on a hardware component such as a server independently of other modules, or a module can exist with other modules on the same server, or within the same program. The module (s), engine(s), and/or unit(s) may be implemented on a hardware component such as a processor, one or more microprocessors, microcomputers, microcontrollers, digital signal processors, central processing units, state machines, logic circuitries, and/or any devices that manipulate signals based on operational instructions. The module (s), engine(s), and/or unit(s) when executed by the processor(s) may be configured to perform any of the described functionalities.

As a further example, the database 509 may be implemented with integrated hardware and software. The hardware may include a hardware disk controller with programmable search capabilities or a software system running on general-purpose hardware. The examples of database are, but not limited to, in-memory database, cloud database, distributed database, embedded database and the like. The database amongst other things, serves as a repository for storing data processed, received, and generated by one or more of the processors, and the modules/engines/units.

The modules/units 505 may be implemented with an AI/ML module that may include a plurality of neural network layers. Examples of neural networks include, but are not limited to, convolutional neural network (CNN), deep neural network (DNN), recurrent neural network (RNN), Restricted Boltzmann Machine (RBM). The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning. At least one of a plurality of CNN, DNN, RNN, RMB models and the like may be implemented to thereby achieve execution of the present subject matter's mechanism through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 201 control the processing of the input data in accordance with a predefined operating rule or artificial intelligence (AI) model stored in the non-volatile memory and the volatile memory. The predefined operating rule or artificial intelligence model is provided through training or learning.

Figure 6:
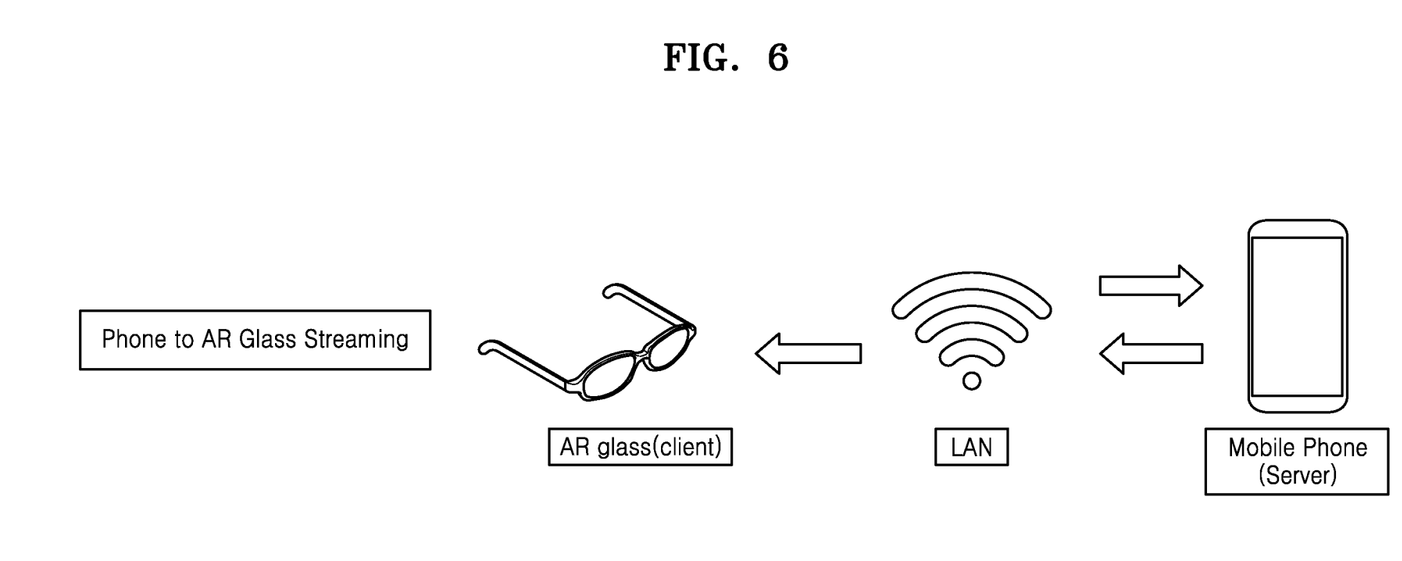
FIG. 6 illustrates an example use case scenario of the phone to AR glass streaming, according to various embodiments.

FIG. 6 illustrates an example use case scenario of phone to AR glass streaming, according to various embodiments. Here the client device is AR glass and the server device is a mobile phone. The transmission medium is Wi-Fi in home/office LAN network without internet. Thus, according to the present disclosure implementation, the AR glass may have client side NN module which may transmit its predicted output to the server device (mobile phone) where the server side NN module will predict bitrate, update the encoder bit rate and set the packet size.

Figure 7:
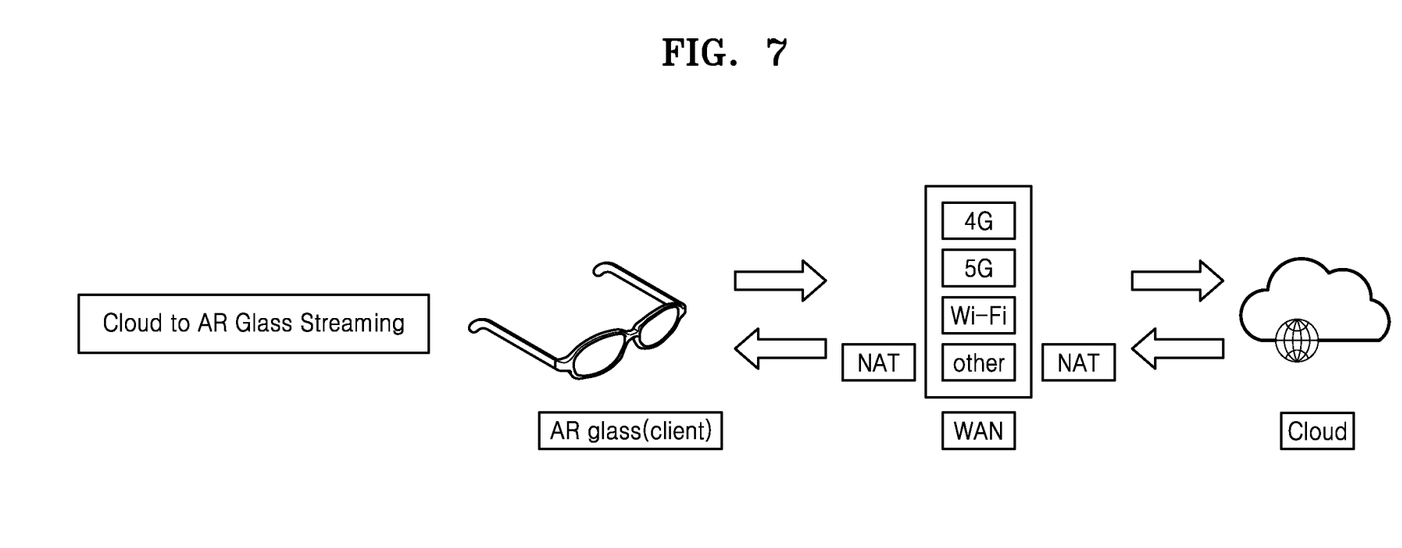
FIG. 7 illustrates an example use case scenario of Cloud to AR Glass Streaming, according to various embodiments.

FIG. 7 illustrates an example use case scenario of Cloud to AR Glass Streaming, according to various embodiments. Here the client device is AR glass and the server device is an external cloud. The transmission medium over the internet can be through mobile cellular network 4G, 5G, Wi-Fi, or another medium. Thus, according to the present disclosure implementation, the AR glass may have client-side NN module which may transmit its predicted output to the cloud whereas the server-side NN module which may predict bitrate and update the encoder bit rate, and set the packet size.

In an embodiment, a method for enhancing video streaming may be provided. The method may include inputting a client-side environment parameter to a client-side neural network (NN) implemented in the client device. The method may include training the client-side NN based on the inputted client-side environment parameter. The method may include determining a client-side encoding bit rate based on a result of the training of the client-side NN. The method may include transmitting the determined client-side encoding bit rate as an input to a server-side neural network (NN) implemented in a server device. The method may include training the server-side NN based on the inputted client-side encoding bit rate and a server-side environment parameter. The method may include determining a server-side encoding bit rate based on a result of the training of the server-side NN. The method may include adjusting an encoding bit rate of an encoder for the video stream based on the determination of the server-side encoding bit rate, and the server-side environment parameter.

In an embodiment, the method may include determining whether the encoding bit rate of the encoder is adjusted with respect to the server-side encoding bit rate. The method may include determining whether the encoding bit rate of the encoder is adjusted with respect to the server-side encoding bit rate. The method may include calculating a size of an UDP packet for streaming the video based on the determination that the encoding bit rate of the encoder is adjusted with respect to the server-side encoding bit rate. The method may include comparing the calculated size of the UDP packet with a predefined threshold UDP packet size. The method may include updating the size of the UDP packet for streaming the video based on a result of comparison. The method may include streaming the video, with the updated size of the UDP packet, to the client device.

In an embodiment, the size of the UDP packet may be increased based on the calculated size of the UDP packet being less than the predefined lower threshold size.

In an embodiment, the size of the UDP packet may be reduced based on the calculated size of the UDP packet being greater than the predefined upper threshold size.

In an embodiment, the method may include streaming the video, via a transmission medium associated with a plurality of networks, with the adjusted encoding bit rate for the video streaming.

In an embodiment, the client device and the server device may include a plurality of NN each corresponding to one of the plurality of networks.

In an embodiment, the method may include determining the transmission medium of the video streaming. The method may include selecting at least one NN from the plurality of NN for training as the client-side NN based on the determination of the transmission medium. The method may include training the selected at least one NN with the inputted client-side environment parameter for determining the client-side encoding bit rate.

In an embodiment, the server device may select at least one NN from the plurality of NN for training as the server-side NN for determining the client-side encoding bit rate based on the selected at least one NN as the client-side NN.

In an embodiment, a system for enhancing video streaming, comprising a client device and a server device operatively communicating with each other within a network may be provided. The system may include one or more processor. The one or more processors may be configured to input a client-side environment parameter to a client-side neural network (NN) implemented in the client device. The one or more processors may be configured to train the client-side NN based on the inputted client-side environment parameter. The one or more processors may be configured to determine a client-side encoding bit rate based on a result of the training of the client-side NN. The one or more processors may be configured to transmit the determined client-side encoding bit rate as an input to a server-side neural network (NN) implemented in a server device. The one or more processors may be configured to train the server-side NN based on the inputted client-side encoding bit rate and a server-side environment parameter. The one or more processors may be configured to determine a server-side encoding bit rate based on a result of the training of the server-side NN. The one or more processors may be configured to adjust an encoding bit rate of an encoder for the video stream based on the determination of the server-side encoding bit rate, and the server-side environment parameter.

In an embodiment, the one or more processors may be configured to determine whether the encoding bit rate of the encoder is adjusted with respect to the server-side encoding bit rate. The one or more processors may be configured to calculate a size of a UDP packet for streaming the video based on the determination that the encoding bit rate of the encoder is adjusted with respect to the server-side encoding bit rate. The one or more processors may be configured to compare the calculated size of the UDP packet with a predefined UDP packet threshold size. The one or more processors may be configured to update the size of the UDP packet for streaming the video based on a result of comparison. The one or more processors may be configured to stream the video, with the updated size of the UDP packet, to the client device.

In an embodiment, the size of the UDP packet may be increased based on the calculated size of the UDP packet being less than the predefined lower threshold size.

In an embodiment, the size of the UDP packet may be reduced based on the calculated size of the UDP packet being greater than the predefined upper threshold size.

In an embodiment, the one or more processors may be configured to stream the video, via a transmission medium associated with a plurality of networks, with the adjusted encoding bit rate for the video streaming.

In an embodiment, the client device and the server device includes a plurality of NN each corresponding to one of the plurality of networks.

In an embodiment, the one or more processors may be configured to determine the transmission medium of the video streaming. The one or more processors may be configured to select at least one NN from the plurality of NN for training as the client-side NN based on the determination of the transmission medium. The one or more processors may be configured to select at least one NN from the plurality of NN for training as the client-side NN based on the determination of the transmission medium.

In an embodiment, a non-transitory machine-readable medium containing instructions that when executed cause one or more processors for enhancing video streaming may be provided. The one or more processors may be configured to input a client-side environment parameter to a client-side neural network (NN) implemented in the client device. The one or more processors may be configured to train the client-side NN based on the inputted client-side environment parameter. The one or more processors may be configured to determine a client-side encoding bit rate based on a result of the training of the client-side NN. The one or more processors may be configured to transmit the determined client-side encoding bit rate as an input to a server-side neural network (NN) implemented in a server device. The one or more processors may be configured to train the server-side NN based on the inputted client-side encoding bit rate and a server-side environment parameter. The one or more processors may be configured to determine a server-side encoding bit rate based on a result of the training of the server-side NN. The one or more processors may be configured to adjust an encoding bit rate of an encoder for the video stream based on the determination of the server-side encoding bit rate, and the server-side environment parameter.

In an embodiment, the one or more processors may be configured to determine whether the encoding bit rate of the encoder is adjusted with respect to the server-side encoding bit rate. The one or more processors may be configured to calculate a size of a UDP packet for streaming the video based on the determination that the encoding bit rate of the encoder is adjusted with respect to the server-side encoding bit rate. The one or more processors may be configured to compare the calculated size of the UDP packet with a predefined UDP packet threshold size. The one or more processors may be configured to update the size of the UDP packet for streaming the video based on a result of comparison. The one or more processors may be configured to stream the video, with the updated size of the UDP packet, to the client device.

In an embodiment, the size of the UDP packet may be increased based on the calculated size of the UDP packet being less than the predefined lower threshold size.

In an embodiment, the size of the UDP packet may be reduced based on the calculated size of the UDP packet being greater than the predefined upper threshold size.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As will be apparent, various working modifications may be made to the method in order to implement the concepts as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method for enhancing video streaming, the method comprising:
    receiving, on a client side, from a server device, a video stream encoded based on a server-side-determined encoding bit rate;
    inputting, on the client side, a client-side environment parameter to a client-side neural network (NN);
    determining, on the client side, a client side encoding bit rate based on an output of the client-side NN inputted to which the client-side environment parameter is input;
    transmitting, from the client side, to the server device, the client-side-determined encoding bit rate for use as an input to a server-side neural network (NN) for adjusting the server-side encoding bit rate; and
    receiving, on the client side, from the server device, a video stream encoded based on a server-side-determined encoding bit rate adjusted based on an output of the server-side NN to which the client-side-determined encoding bit rate and a server-side environment parameter are input;
    wherein the video stream includes packet according to an UDP packet size for the video stream;
    wherein the UDP packet size is updated to increase based on a calculated UDP packet size being less than a threshold UDP packet size; and
    wherein the calculated UDP packet size is based on the server-side-determined encoding bit rate.

2. The method of claim 1, wherein the UDP packet size is reduced based on the calculated UDP packet size being greater than the threshold UDP packet size.

3. The method of claim 1, further comprising:
    receiving the video stream, via a transmission medium associated with a plurality of networks.

4. The method of claim 3, wherein the client device includes a plurality of NNs each corresponding to one of the plurality of networks.

5. The method of the claim 4, further comprising:
determining the transmission medium of the video stream; and
selecting at least one NN from the plurality of NNs for training as the client-side NN based on the determining of the transmission medium.

6. A method for enhancing video streaming, the method comprising:
transmitting, to a client device, a video stream based on an encoding bit rate;
receiving, from the client device, a client-side-determined encoding bit rate determined
based on an output of a client-side neural network (NN) to which a client-side environment parameter is input;
inputting the client-side-determined encoding bit rate and a server-side environment parameter to a server-side NN;
adjusting the encoding bit rate based on an output of the server-side NN to which the client-side-determined bit rate and the server-side environment parameter are input;
adjusting an encoding bit rate of the encoder for a video stream based on the adjusted server-side encoding bit rate;
calculating a size of an UDP packet for the video stream;
comparing the calculated UDP packet size with a threshold UDP packet size;
updating the UDP packet size for the video stream based on the comparing, wherein the UDP packet size is increased based on the calculated UDP packet size being less than the
threshold UDP packet size; and
transmitting, to the client device, the video stream based on the adjusted encoding.

7. A server device for enhancing video streaming, operatively communicating with a client device within a network, the server device comprising at least one processor configured to:
transmit, to the client device, a video stream based on an encoding bit rate;
receive, from the client device, a client-side-determined encoding bit rate determined based on an output of a client-side neural network (NN) to which a client-side environment parameter is input;
input the client-side-determined encoding bit rate and a server-side environment parameter to a server-side NN;
adjust the encoding bit rate based on an output of the server-side NN to which the client-side-determined bit rate and the server-side environment parameter are input;
adjust an encoding bit rate of an encoder for the video stream based on the adjusted determined server side encoding bit rate;
calculate a size of an UDP packet for the video stream;
compare the calculated UDP packet size with a threshold UDP packet size;
update the UDP packet size for the video stream based on the comparing, wherein the UDP packet size is increased based on the calculated UDP packet size being less than the threshold UDP packet size; and
transmit, to the client device, the video stream based on the adjusted encoding bit rate.

8. The server device of claim 7, wherein the UDP packet size is reduced based on the calculated UDP packet size being greater than the threshold UDP packet size.

9. The server device of claim 7, wherein one or more of the at least one processor is configured to:
transmit the video stream, via a transmission medium associated with a plurality of networks, with the adjusted encoding bit rate.

10. The server device of claim 9, wherein the server device includes a plurality of NNs each corresponding to one of the plurality of networks.

11. The server device of the claim 10, wherein one or more of the at least one processor is configured to:
determine the transmission medium of the video stream; and
select at least one NN from the plurality of NNs for training as the client-side NN based on the determining of the transmission medium.

12. The server device of claim 11, wherein one or more of the at least one processor is configured to select at least one NN from the plurality of NNs for training as the server-side NN based on the selected at least one client-side NN.

13. The method of claim 6, wherein the server device includes a plurality of NNs each corresponding to one of the plurality of networks, and the method further comprises:
selecting at least one NN from the plurality of NNs for training as the server-side NN.

* * * * *